(No Model.) 2 Sheets—Sheet 1.

G. A. BARTH.
VALVE FOR STEAM ENGINES.

No. 401,924. Patented Apr. 23, 1889.

WITNESSES.
S. L. Schrader.
W. M. Byrne.

INVENTOR.
Gustav A. Barth
by Paul Bakewell
his attorney (No Model.)
2 Sheets—Sheet 2.

G. A. BARTH.
VALVE FOR STEAM ENGINES.

No. 401,924.
Patented Apr. 23, 1889.

WITNESSES.
S. L. Schrader
W. M. Byrne.

INVENTOR.
Gustav A. Barth
Paul Bakewell
his attorney

UNITED STATES PATENT OFFICE.

GUSTAV A. BARTH, OF ST. LOUIS, MISSOURI, ASSIGNOR TO PIERRE CHOUTEAU, OF SAME PLACE.

VALVE FOR STEAM-ENGINES.

SPECIFICATION forming part of Letters Patent No. 401,924, dated April 23, 1889.

Application filed February 2, 1889. Serial No. 298,473. (No model.)

*To all whom it may concern:*

Be it known that I, GUSTAV A. BARTH, a citizen of the United States, residing at the city of St. Louis, State of Missouri, have invented a certain new and useful Improvement in Steam and other Motive Power Engines, of which the following is a full, clear, and exact description.

My invention relates to improvements in steam and other motive power engines, wherein the piston is reciprocated in the cylinder by the action of its valve without the intervention of valve-operating mechanism, and has for its object to insure a positive and uniform action of the valve.

My invention comprises a cylinder having combined inlet and exhaust ports and passages to and from a steam-chest containing a slide or distribution valve, combined with an auxiliary valve having specially-arranged steam and relief passages, a piston fitted within the cylinder and having a rod working through the cylinder-cover, with separate relief-passages opening from the cylinder into the steam-chest behind the ends of the auxiliary valve, the whole operating to hold and reverse the distribution-valve at the proper times, and so control the admission and exhaust of steam or other motive fluid to and from each side of the piston alternately.

Figure 1:
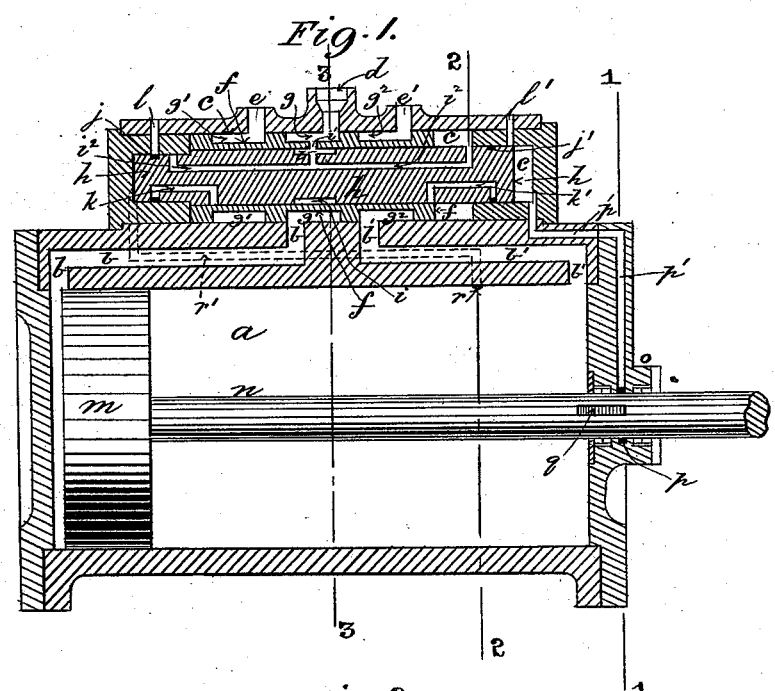
Figure 2:
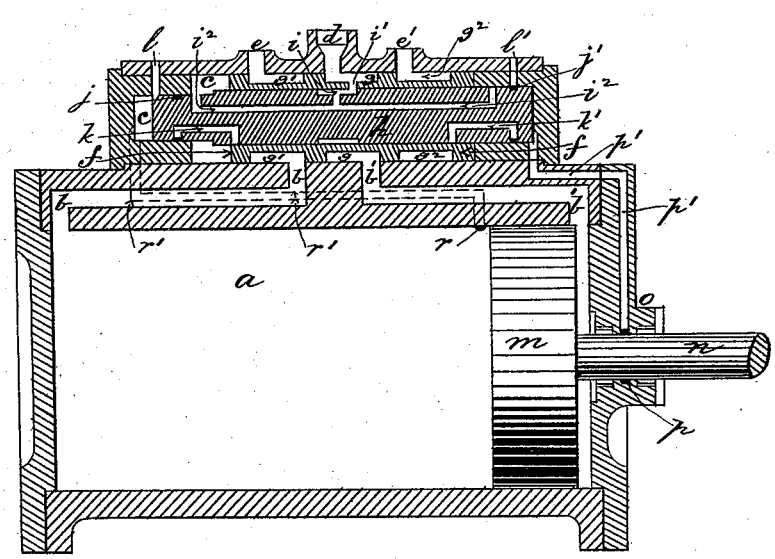
Figure 3:
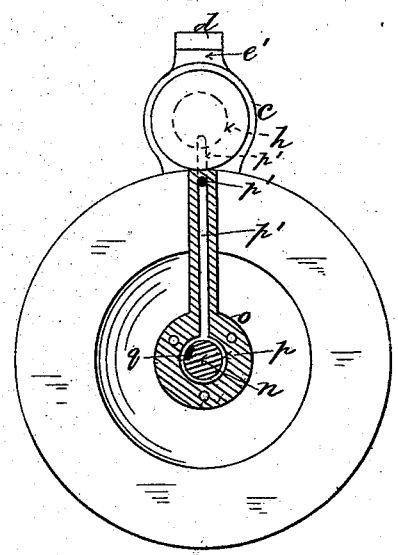
Figure 4:
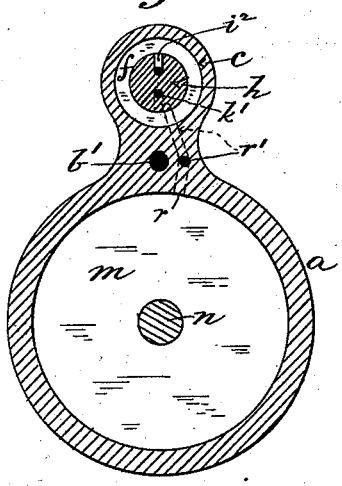
Figure 5:
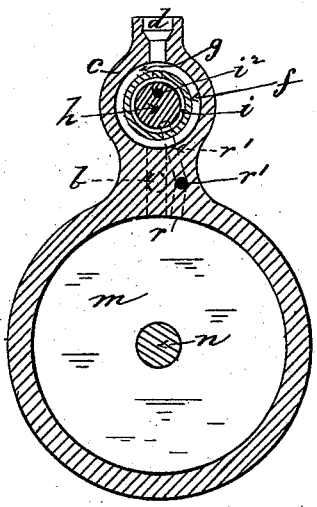

On the accompanying drawings, Figure 1 represents a central longitudinal section of my improved steam or other motive power engine, the piston being shown at the rear end of its stroke in the cylinder; Fig. 2, a similar view thereof with the piston at the front end of its stroke, and Figs. 3, 4, and 5 transverse sections on lines 1 1, 2 2, and 3 3, respectively, in Fig. 1, like letters of reference denoting like parts in all the figures.

$a$ represents a cylinder having combined inlet and exhaust ports and passages $b$ $b'$, opening, respectively, from the rear and front ends of the cylinder $a$ into a steam-chest, $c$, which is provided with an inlet-port, $d$, and exhaust-ports $e$ $e'$. Within the steam-chest $c$ is fitted a slide or distribution valve, $f$, preferably circular in form, and having three circumferential grooves or passages, $g$ $g'$ $g^2$, which extend entirely around the distribution-valve $f$, the passage $g$ commanding the inlet ports and passages $d$ $b$ and $d'$ $b'$ alternately, passage $g'$ commanding the outlet passage and port $b$ $e$, and the passage $g^2$ commanding the outlet passage and port $b'$ $e'$ during the operation of the distribution-valve $f$, as hereinafter more particularly described.

Fitted longitudinally within and capable of sliding endwise and steam-tight through the distribution-valve $f$ is an auxiliary cylindrical valve, $h$, the ends of which (one end being of smaller diameter than the other) project beyond the distribution-valve $f$ and fit steam-tight within recesses composing the corresponding ends of the steam-chest $c$. In the auxiliary valve $h$, at about the middle of its length, is formed a circumferential groove or passage, $i$, of suitable width, which receives steam or other motive fluid at all times through an opening, $i'$, in the wall of the distribution-valve $f$ from the main inlet-passage $g$ of the latter, the passage $i$ communicating with a passage, $i^2$, formed longitudinally in the auxiliary valve $h$, and opening at each end into the steam-chest $c$ behind the corresponding end of the distribution-valve $f$.

In the auxiliary valve $h$, adjacent to the ends thereof, are circumferential grooves or passages $j$ $j'$, having branch longitudinal passages $k$ $k'$, respectively, for establishing communication between the steam-chest $c$, behind the corresponding ends of the distribution-valve $f$, and the outlet relief-ports $l$ $l'$ from the steam-chest $c$ into the external air (or exhaust) alternately during the operation of the valves $f$ and $h$, as hereinafter more particularly referred to. Within the cylinder $a$ is fitted a piston, $m$, having a piston-rod, $n$, which passes steam-tight through a stuffing-box, $o$, in the cylinder-cover. In the stuffing-box $o$ is an annular space, $p$, surrounding the piston-rod $n$ and communicating by a passage, $p'$, extending through the cylinder cover and wall with the front end of the steam-chest $c$ behind the corresponding end of the auxiliary valve $h$. Communication is effected between the annular space $p$ and the cylinder $a$ during the rear stroke of the piston $m$ by a groove or passage, $q$, which is formed longitudinally in the circumference of the piston-rod $n$.

In the cylinder $a$, at a certain distance from its front end, is an opening, $r$, which communicates by a passage, $r'$, with the rear end of the steam-chest $c$, behind the corresponding end of the auxiliary valve $h$.

As seen in Fig. 1, the piston $m$ is at the rear end of its stroke in the cylinder $a$ and the slide or distribution valve $f$ (with the auxiliary valve $h$) at the corresponding end of the steam-chest $c$, so that its passages $g$ $g^2$ establish communication between the inlet-port $d$ and passage $b$ and between the outlet-passage $b'$ and port $e'$, whereby steam or other motive fluid passes from the inlet-port $d$ through passage $b$ into the cylinder $a$ on the rear side of the piston $m$, which is thereby forced toward the front end of the cylinder $a$ until clear of the opening $r$ in the cylinder $a$, when steam from behind the piston $m$ passes through passage $r'$ into the steam-chest $c$ behind the rear end of the auxiliary valve $h$, which is thereby forced over against the front end of the steam-chest $c$, and in so doing the rear outlet of the passage $i^2$ is moved so as to admit steam from the passage $i^2$ into the steam-chest $c$ between the shoulder of its rear recessed end and the corresponding end of the distribution-valve $f$, which is thereby thrown forward or reversed in the steam-chest $c$, as seen in Fig. 2, so that its passage $g$ opens communication between the inlet-port $d$ and passage $b'$, and its passage $g'$ opens communication between the outlet-passage $b$ and port $e$, when steam entering the cylinder $a$ on the front side of the piston $m$ and exhausting from its rear side will force the piston $m$ toward the rear end of the cylinder $a$.

Meanwhile by the reversal of the auxiliary valve $h$ and consequent uncovering of its branch relief-passage $k'$ to the steam-chest $c$ the steam confined between the front end of the distribution-valve $f$ and the shoulder of the corresponding recessed end of the steam-chest $c$ escapes through the front relief-passages, $k'$ $j'$ $l'$, into the external air (or exhaust, as may be arranged) for permitting the free movement of the distribution-valve $f$ during its forward movement. As the piston $m$ approaches the termination of its rear stroke the groove $q$ in the piston-rod $n$ enters the cylinder $a$ and allows steam from the front side of the piston $m$ to pass through the passages $p$ $p'$ into the steam-chest $c$, behind the auxiliary valve $h$, at its front end, which being of superior area to its rear end, the auxiliary valve $h$ is thereby thrown over or returned to the rear end of the steam-chest $c$, as in Fig. 1, and moves the front outlet of the relief-passage $i^2$ so as to admit steam to the steam-chest $c$ between the shoulder of its recessed end and the front end of the distribution-valve $f$, which is thereby also reversed or forced rearward into its original position, as in Fig. 1, the steam which was behind the distribution-valve $f$ meanwhile escaping through the rear relief-passages, $k$, $j$, and $l$ into the external air, when the operation is repeated.

By the use of the auxiliary valve $h$ with the special arrangement of its relief-passages "hanging" of the distribution-valve is prevented and its action rendered positive under varying pressures and speed.

I claim—

1. In a steam or other motive power engine, the combination of a cylinder having inlet and exhaust ports and passages, a steam-chest having inlet and exhaust ports and containing a slide or distribution valve provided with an auxiliary valve having passages opening from and into the steam-chest, a piston fitted within the cylinder, and a piston-rod having a groove or passage, with separate relief-passages opening from the cylinder into the steam-chest, substantially as shown, and for the purpose described.

2. In a steam or other motive power engine, the combination of a cylinder having combined inlet and exhaust ports and passages, a steam-chest having inlet and exhaust ports and containing a slide or distribution valve, an auxiliary valve fitted in and projecting through the distribution-valve into the recessed ends of the steam-chest, said auxiliary valve having a passage opening from the main inlet-passage of the distribution-valve into the steam-chest behind each end of the distribution-valve and relief-passages opening, respectively, from the steam-chest behind the corresponding ends of the distribution-valve through outlet-ports in the recessed ends of the steam-chest into the external air, (or exhaust,) a piston fitted within the cylinder and having a rod passing through the cylinder-cover, said rod having a longitudinal groove or passage, with separate relief-passages opening from the cylinder into the steam-chest behind the respective ends of the auxiliary valve, all operating to hold and reverse the distribution-valve, and so control the admission and exhaust of steam or other motive fluid to and from each side of the piston alternately, substantially as shown and described.

3. The combination of a cylinder, $a$, having inlet and exhaust ports and passages $b$ $b'$, steam-chest $c$, having inlet-port $d$, exhaust-ports $e$ $e'$, and outlet relief-passages $l$ $l'$, a slide or distribution valve, $f$, located in steam-chest $c$ and formed with circumferential grooves or passages $g$ $g'$ $g^2$, an auxiliary valve, $h$, having steam-passages $i$ $i'$ $i^2$ and relief or exhaust passages $j$ $k$ and $j'$ $k'$, a piston, $m$, fitted within the cylinder $a$ and provided with a rod, $n$, passing through a stuffing-box, $o$, in the cylinder-cover and having a longitudinal groove or passage, $q$, with separate relief-passages, $p$ $p'$ and $r$ $r'$, substantially as shown, and for the purpose described.

4. The combination of the cylinder $a$, steam-chest $c$, distribution-valve $f$, auxiliary valve $h$, and piston-rod $n$, passing through stuffing-box $o$ in cylinder-cover, all being provided with openings and passages, substantially as set forth, the said auxiliary valve $h$ having its respective end portions of different diameters and adapted to slide longitudinally and steam-tight within the correspondingly-recessed ends of the steam-chest $c$, with the piston $m$, substantially as shown, and for the purpose described.

In testimony whereof I affix my signature, in presence of two witnesses, this 30th day of January, 1889.

GUSTAV A. BARTH.

Witnesses:
S. L. SCHRADER,
PAUL BAKEWELL.